US 8,733,831 B2
May 27, 2014

(12) United States Patent
Brawner

(10) Patent No.: US 8,733,831 B2
(45) Date of Patent: May 27, 2014

(54) MOUNTING ASSEMBLY FOR SECURING AN ENTERTAINMENT DEVICE TO A VEHICLE SEAT

(71) Applicant: Atom, Enterprises, Inc., Winter Garden, FL (US)

(72) Inventor: Jeffrey D. Brawner, Tampa, FL (US)

( * ) Notice: Subject to any disclaimer, the term of this patent is extended or adjusted under 35 U.S.C. 154(b) by 0 days.

(21) Appl. No.: 13/790,318

(22) Filed: Mar. 8, 2013

(65) Prior Publication Data

US 2014/0077576 A1    Mar. 20, 2014

Related U.S. Application Data

(60) Provisional application No. 61/702,158, filed on Sep. 17, 2012, provisional application No. 61/750,842, filed on Jan. 10, 2013.

(51) Int. Cl.
*A47C 7/62* (2006.01)
*A47C 7/72* (2006.01)

(52) U.S. Cl.
USPC ............. 297/188.05; 297/463.1; 297/217.3; 297/188.06

(58) Field of Classification Search
USPC ............. 297/463.1, 217.3, 188.05, 188.06; 348/837
See application file for complete search history.

(56) References Cited

U.S. PATENT DOCUMENTS

| | | | |
|---|---|---|---|
| 7,070,237 B2 * | 7/2006 | Rochel | 297/217.3 |
| 7,111,814 B1 * | 9/2006 | Newman | 297/188.06 |
| 7,201,443 B2 | 4/2007 | Cilluffo et al. | |
| 7,364,230 B2 * | 4/2008 | Zheng | 297/188.2 X |
| 7,784,864 B2 | 8/2010 | Feder | |
| 8,109,569 B2 * | 2/2012 | Mitchell | 297/217.3 X |
| 8,136,777 B2 | 3/2012 | Brawner | |
| 2012/0125959 A1 | 5/2012 | Kucera | |

* cited by examiner

*Primary Examiner* — Anthony D Barfield
(74) *Attorney, Agent, or Firm* — Maxey Law Offices PLLC; Stephen Lewellyn

(57) ABSTRACT

A mounting assembly for securing an entertainment device to a vehicle seat having a pair of spaced headrest post guides extending through a top surface of the vehicle seat is provided. The mounting assembly includes a first bracket member having a first end and a second end opposite the first end. The first end and the second end each configured to attach to a respective headrest post guide with the first bracket member extending between the headrest post guides. A second bracket member is configured to support an entertainment device and is slidingly attached to the first bracket member and is selectively securable between forward and aft locations relative to the first bracket member to position the entertainment device rearwardly of the vehicle seat.

13 Claims, 9 Drawing Sheets

MOUNTING ASSEMBLY FOR SECURING AN ENTERTAINMENT DEVICE TO A VEHICLE SEAT

CROSS-REFERENCE TO RELATED APPLICATIONS

This application claims the benefit of U.S. provisional patent application Ser. No. 61/702,158, filed Sep. 17, 2012 and the benefit of U.S. provisional patent application Ser. No. 61/750,842, filed Jan. 10, 2013, each of which are incorporated by reference herein in their entirety.

FIELD OF THE INVENTION

The present invention relates generally to securing entertainment devices to the headrest of a vehicle seat, and more particularly, relating to a mounting assembly for securing an entertainment device to headrest post guides.

BACKGROUND OF THE INVENTION

Portable entertainment devices including computer tablets, ebook readers, and smart phones are becoming increasingly popular and are now routinely carried to provide entertainment while traveling. In addition to portable entertainment devices, vehicle integrated entertainment devices are likewise becoming increasingly popular.

Conventionally, vehicle integrated entertainment devices also referred to as rear seat entertainment systems are mounted inside the back of a vehicle headrest. This requires expensive replacement headrests that are specifically manufactured for mounting a monitor within the headrest or requires the modification of the headrest so that a monitor may be fitted within the headrest. Because of this, there has been an increasing desire to mount, attached, or otherwise secure rear seat entertainment systems to the headrest posts of the vehicle seat to avoid having to purchase expensive replacement headrests or having to modify an existing headrest.

In an attempt to fulfill this desire, numerous devices have been employed that attached rear seat entertainment systems to headrest posts. While these devices heretofore meet their respective objectives and requirements, they have many drawbacks. The drawbacks include interfering with the operation of the headrest and an unattractive appearance. A further drawback is found in the non-standardized spacing between headrest posts, vehicle seat thickness, and headrest post placement between various vehicles across the same and different vehicle manufactures.

In addition to overcoming these drawbacks, there is an additional desire to be able to removably mount or secure a portable entertainment device to a vehicle seat for hands free operation.

SUMMARY OF THE INVENTION

Embodiments of the present invention addresses one or more of these needs by providing a single mounting assembly that is adjustable and easily configured to permit use across vehicle platforms.

Embodiments of the present invention also addresses one or more of these needs by providing a mounting assembly that is low profile to blend into and not detract from the vehicle interior.

Embodiments of the present invention also addresses one or more of these needs by providing a mounting assembly that attaches to the headrest post guides and in no way interferes with the operation of the headrest or makes contact with the headrest posts.

Embodiments of the present invention also addresses one or more of these needs by providing a mounting assembly that includes a frame or other suitable support for removably receiving and retaining therein a portable entertainment device.

Embodiments of the present invention also addresses one or more of these needs by providing a mounting assembly that includes a monitor.

Embodiments of the present invention also addresses one or more of these needs by providing a mounting assembly that has an integrated console for housing an entertainment system.

To achieve these and other advantages, in one aspect a mounting assembly for securing an entertainment device to a vehicle seat having a pair of spaced headrest post guides extending through a top surface of the vehicle seat is provided. The mounting assembly includes a first bracket member having a first end and a second end opposite the first end. The first end and the second end each configured to attach to a respective headrest post guide with the first bracket member extending between the headrest post guides. A second bracket member is configured to support an entertainment device and is slidingly attached to the first bracket member and is selectively securable between forward and aft locations relative to the first bracket member to position the entertainment device rearwardly of the vehicle seat.

The first end and the second end of the first bracket member may be configured to receive and clamp the respective headrest post guide at a position between the top of the vehicle seat and a top flange of the headrest post guide. The first bracket member may be extensible between extended and retracted positions to accommodate the space between the headrest post guides. The first end and the second end of the first bracket member may include a post guide clamp comprising a fixed jaw member and a movable jaw member constrained for sliding movement relative to the fixed jaw member and a pair of fasteners securing the fixed jaw member with the movable jaw member.

To achieve these and other advantages, in another aspect a mounting assembly for securing an entertainment device to a vehicle seat having a pair of spaced headrest post guides extending through a top surface of the vehicle seat is provided. The mounting assembly includes a first bracket member having first and second telescopically engaged wing members that are movable relatively to one another between extended and retracted positions to adjust to the space between the headrest post guides. The first wing member and the second wing member each configured to attach to a respective headrest post guide with the first bracket member extending between the headrest post guides. A second bracket member is configured to support an entertainment device and is slidingly attached to the first bracket member and selectively securable between forward and aft locations relative to the first bracket member to position the entertainment device rearwardly of the vehicle seat.

The first wing member and the second wing member may be further configured to attach to the respective headrest post guide at a position between the top of the vehicle seat and a top flange of the headrest post guide and without contacting a headrest post inserted through the headrest post guide. The first wing member may have a downwardly open track and the second wing member may have an upwardly raised platform that is slidingly received within the track so as to provide the telescopic engagement between the first wing member and the second wing member. The first wing member have parallel first and second slots, the second wing member may have parallel third and fourth slots that are cooperatively aligned with the first and second slots, respectively, and the second bracket member may have a fifth slot that is cooperatively aligned with the first, second, third, and fourth slots. A first fastener may extending through the first, third, and fifth slot and a second fastener extending through the second, fourth, and fifth slot.

The first and second fasteners are threaded fasteners when loosened simultaneously permit the telescopic adjustment between the first wing member and the second wing member and the forward and aft adjustment of the second bracket, and when tightened simultaneously secure the telescopic position between the first wing member and the second wing member and the forward and aft position of the second bracket.

To achieve these and other advantages, in another aspect a mounting assembly for securing an entertainment device to a vehicle seat is provided. The mounting assembly includes first and second headrest post guides disposed within the vehicle seat at a spaced distance between one another and having a top flange exteriorly of a top surface of the vehicle seat. A first bracket member has a first end and a second end opposite the first end. The first end of the bracket member is removably secured to the first headrest post guide between its top flange and the top of the vehicle seat. The second end of the bracket member is removably secured to the second headrest post guide between its top flange and the top of the vehicle seat. And the first bracket member extends between the first headrest post guide and the second headrest post guide. A second bracket member is configured to support an entertainment device and is slidingly attached to the first bracket member and is selectively secured to the first bracket member between forward and aft locations relative to the first bracket member positioning the entertainment device rearwardly of the vehicle seat.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
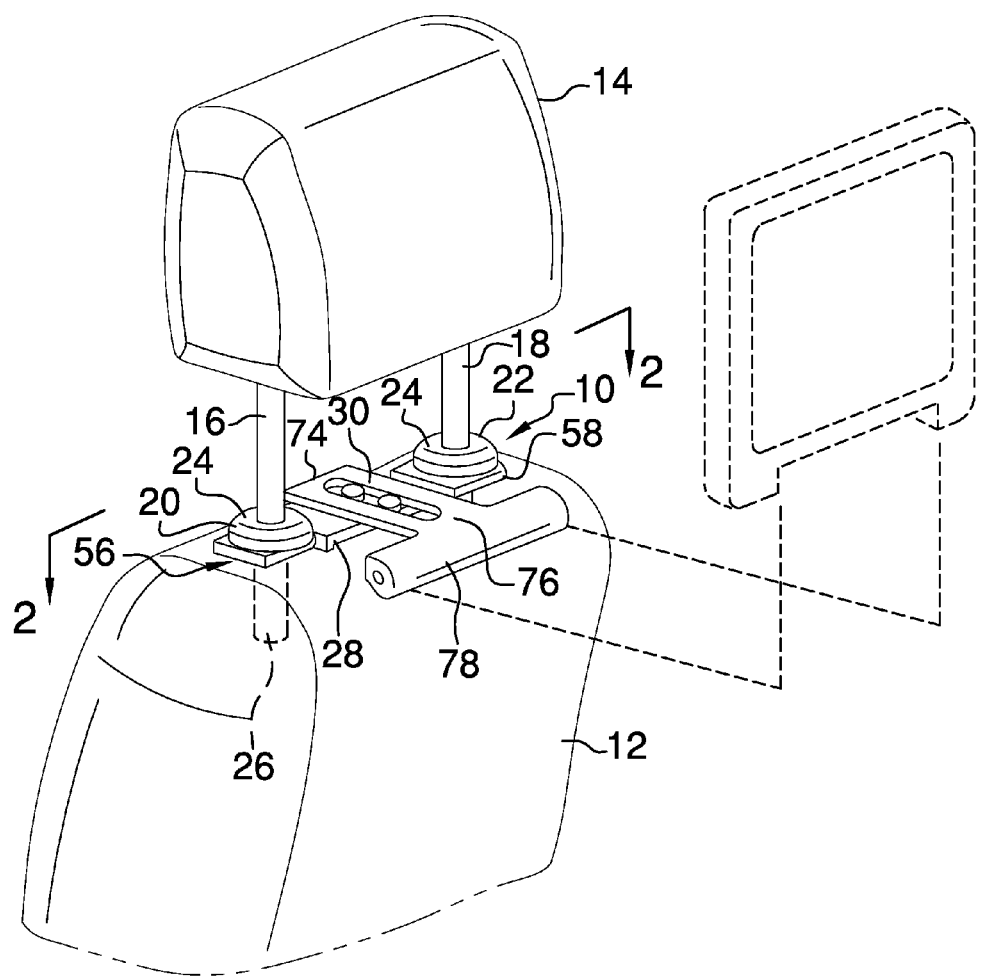
FIG. 1 is a perspective view of the a bracket assembly for securing an entertainment device to a vehicle seat constructed in accordance with the principles of an embodiment of the present invention and shown in use with a conventional vehicle seat.
Figure 2:
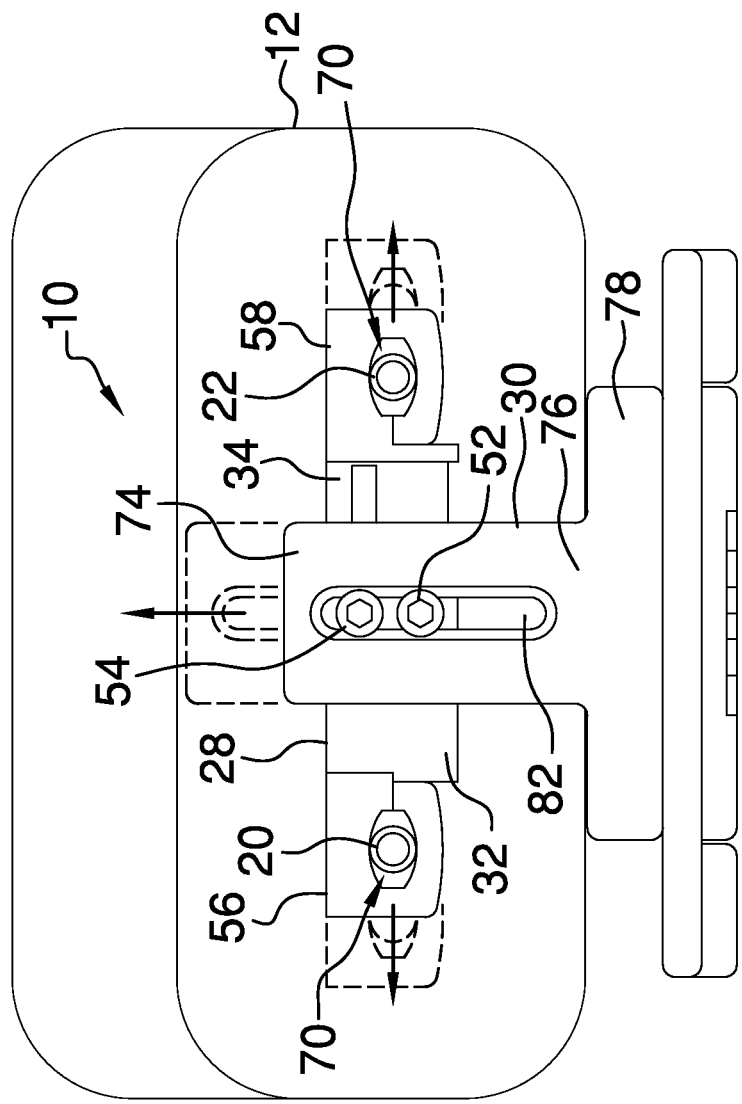
FIG. 2 is a cross-sectional view taken along line 2-2 of FIG. 1.
Figure 3:
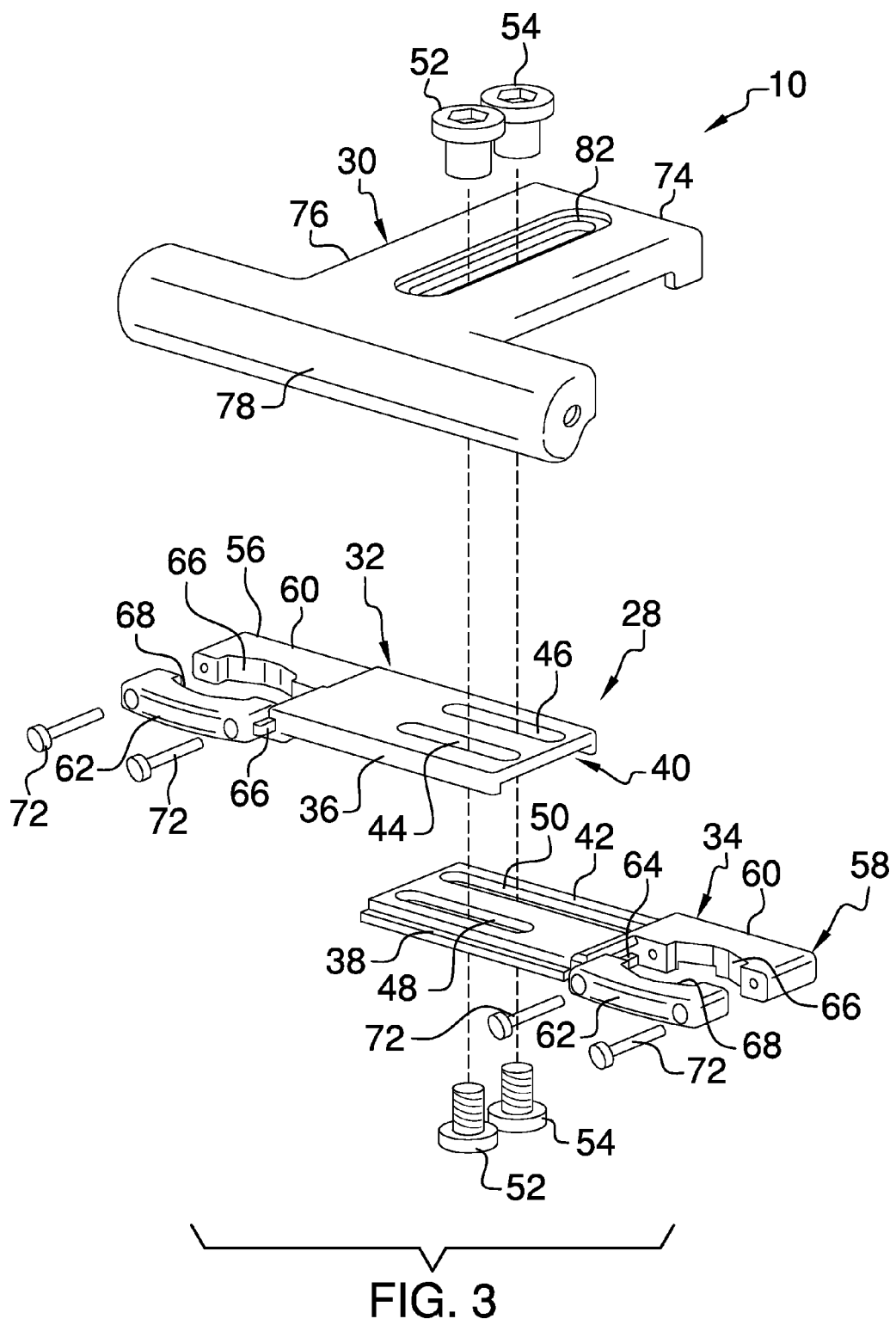
FIG. 3 is an exploded perspective view of the bracket assembly of FIG. 1.
Figure 4:
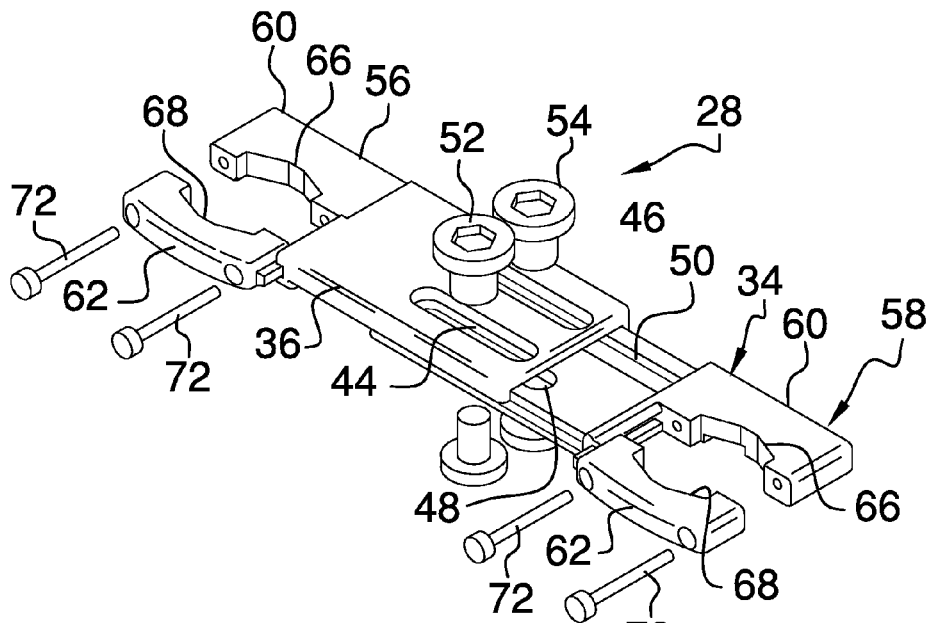
FIG. 4 is a perspective view of a first bracket member of the bracket assembly of FIG. 1.
Figure 5:
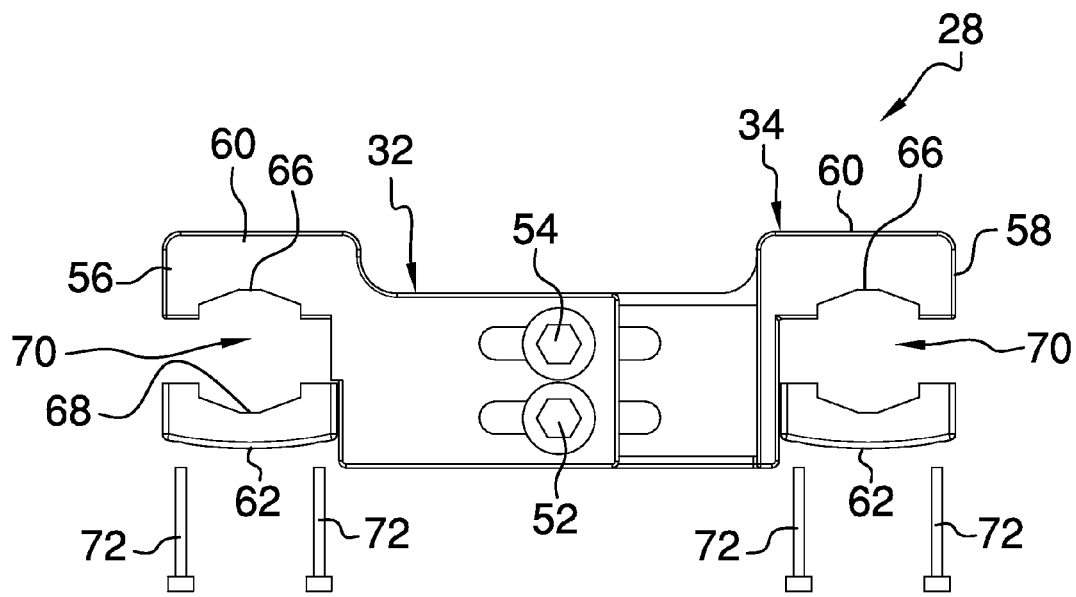
FIG. 5 is a top plan view of the first bracket member.
Figure 6:
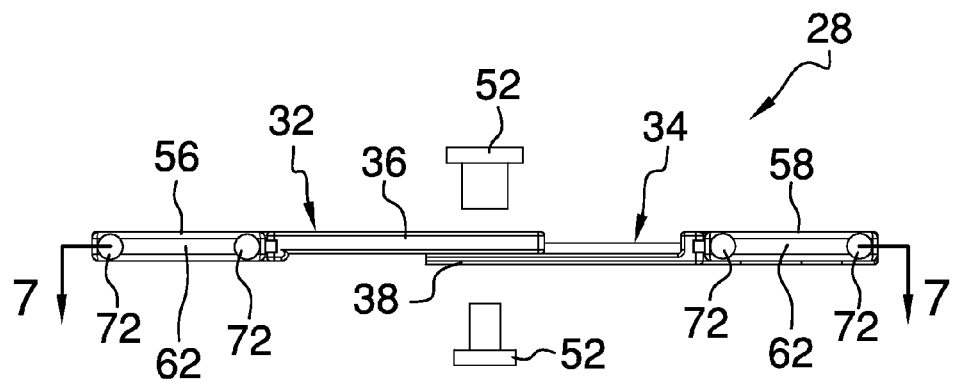
FIG. 6 is a side elevation view of the first bracket member.
Figure 7:
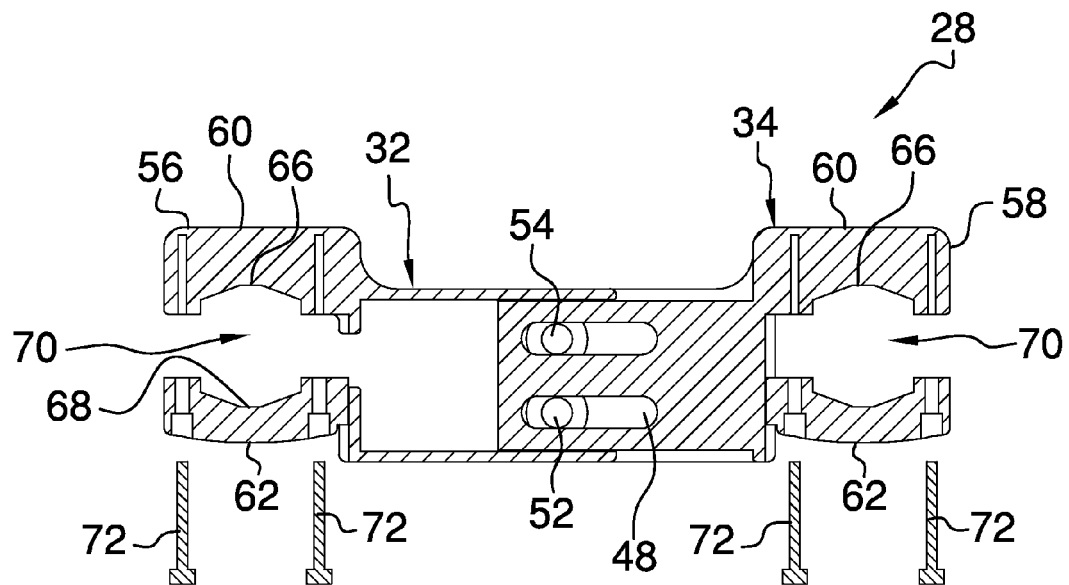
FIG. 7 is a cross-sectional view of the first bracket member taken along line 7-7 in FIG. 6.

Referring initially to FIGS. 1 through 7, there is representatively illustrated a mounting assembly 10 in accordance with a first embodiment embodying principles of the present invention. Mounting assembly 10 illustrates the principles of the present invention in its simplest form and is illustrated in connection with a conventional vehicle seat 12 having a headrest 14. Headrest 14 includes headrest posts 16 and 18 that downwardly depend from the bottom of the headrest and which are telescopically received by headrest post guides 20 and 22, respectively. Each headrest post guide 20 and 22 extends downwardly into the vehicle seat 12 through a top thereof and include a top flange 24 that disposed on the top and tubular portion 26 (only one is visible) that extends into the seat.

Mounting assembly 10 is configured to attach to the headrest post guides 20 and 22 at a position between the top of the vehicle seat and the top flange or cap 24 without contacting either of the headrest posts 16 and 18 that extend into the headrest post guides.

Mounting assembly 10 broadly includes a first bracket member 28 and a second bracket member 30. With the mounting assembly 10 attached to the vehicle seat 12, the first bracket member 28 is oriented in a transverse direction and extends between the headrest post guides 20 and 22 and the second bracket member 30 is oriented in a general direction that is perpendicular to the vehicle seat (e.g. in a general front-to-rear direction).

The first bracket member 28 is attached at opposite ends thereof to the headrest post guides 20 and 22, and is extensible and retractable in length to accommodate different spacing between headrest post guides. Similarly, the second bracket member 30 is slidingly connected to the first bracket member 28 for movement or adjustment along the forward-aft direction relative to the bracket wing to accommodate different vehicle seat depths or thickness.

The first bracket member 28 includes left and right wing members 32 and 34 that are telescopically engaged with one another for movement relative to one another between extended and retracted positions to adjust the length of the bracket wing in accommodating the space between headrest post guides 16, 18. Wing members 32 and 34 each include slides 36 and 38, respectively, which provide the telescopic engagement between the wing members. Slides 36 and 38 are telescopically engaged through a guided overlap configuration wherein slide 36 overlaps slide 38. More specifically, in an embodiment, slide 36 includes a downwardly open track 40 and slide 38 includes an upwardly raised platform 42 that is slidingly received within track 40, thereby providing the telescopic engagement between wing members 32 and 34.

Slide 36 includes a pair of spaced through slots 44 and 46, and similarly, slide 38 includes a pair of spaced through slots 48 and 50 that are in cooperative alignment, respectively, when the slides are telescopically engaged. Slides 36 and 38, and thus wing members 32 and 34, are held together and secured to the carrier bracket 24 by fasteners 52 and 54 extending through slot 44 of the carrier bracket, further fastener 52 extends through cooperative slots 44 and 48, and further fastener 54 extends through cooperative slots 46 and 48.

Wing members 32 and 34 each further include post guide clamps 56 and 58, respectively, which operate to encircle and clamp against the exterior of the headrest post guides 20, 24 thereby attaching the bracket 10 to the vehicle seat 12. Each clamp 56 and 58 are of a similar construction, and accordingly, the clamps will be described in a manner that utilizes the same element numbers for the similar elements. Clamp 56, 58 includes a fixed jaw member 60 that is secured to slide 36, 38 and a movable jaw member 62 that is constrained for sliding movement relative to the fixed jaw member. Jaw member 62 is constrained to sliding movement by a tongue-in-grove connection between jaw member 60 and slide 36, 38 that includes a groove 64 formed in an end of the slide 36, 38 and a corresponding tongue 66 extending from a cooperating edge of the jaw member. Jaw members 60 and 62 include confronting semi-circular cutouts or recesses 66 and 68, respectively, that define a space 70 into which is received the headrest post guide 20, 22. Jaw member 62 is secured to jaw member 60 by threaded fasteners 72 which also serve to clamp the jaw members about the headrest post guides 20, 22 by drawing in jaw member 62 towards jaw member 60 when tightened.

The second bracket member 30 is generally elongated and includes opposite ends 74 and 76, and a system mount 78 at end 76. End 76 or system mount 78 is configured to have attached thereto various components of a rear seat entertainment system or a frame or other suitable structure for removable receiving and retaining a portable entertainment device to be supported and positioned behind the headrest 14 of the vehicle seat 12. A monitor 80 is representatively illustrated as an exemplary component that can be attached to system mount 78. It is important to note that system mount 78 may be configured in countless ways to permit attaching or mounting a component thereto for support.

The second bracket member 30 further includes an elongated slot 82 extending between ends 74 and 76 through which threaded fasteners 52, 54 are passed and secured to slidingly connect the second bracket member to the first bracket member 28 to permit the above described relative movement between the first and second bracket members for adjusting the carrier bracket position to accommodate vehicle seat thickness. Fasteners 52, 54 are tightened to retain the relative positions between the first and second bracket members 28 and 30, and also the relative positions between the first and second wing members 32 and 34.

In use, bracket assembly 10 is secured to the vehicle seat 12 by first removing or lifting the headrest 14 from the vehicle seat by lifting upwardly upon the headrest to withdraw headrest posts 16, 18 from headrest post guides 20, 22. It may be possible to install the bracket assembly 10 without completely removing the headrest 14 from the seat 12 depending on the particular seat and headrest construction. Threaded fasteners 52, 54 are loosened to enable relative, sliding between the first bracket member 28 and second bracket member 30, and to enable telescoping of wing members 32, 34 while retaining the bracket assembly together. Jaw member 62 of each clamp 56, 58 is detached and placed to the side. With jaw members 62 removed, jaw members 60 are slipped between headrest post guide gaps 24 and the top of vehicle seat 12 to position and engage headrest post guides 20, 22 with jaw members 60. Wing members 32, 34 are freely moveable to extend or retract to the spacing between the headrest post guides 20, 22. Additionally, the second bracket member 30 is freely slidable relative to the first bracket member 28 to position the system mount 78 rearwardly of the vehicle seat back.

At this time, one may tighten fasteners 52, 54 to secure the relative position of the first bracket member 28 and wing members 32, 34 and the second bracket member 30. Once fasteners 52, 54 are tightened, jaw member 62 may be secured to jaw member 60 of each clamp 56, 58 to clamp against headrest post guides 20, 22 by threaded fasteners 72 so that the bracket assembly 10 is secured the vehicle seat 12 via the headrest post guides. Alternatively, one may first attach jaw members 62 as described above, and then tighten fasteners 52, 54.

With this configuration, clamps 56, 58, and thus the bracket assembly 10 are securely attached to the vehicle seat 12 via the conventional headrest post guides 20, 22 without engagement with the headrest posts 16, 18. Further, once fasteners 52, 54 are secured, the second bracket member 30 is prevented from moving laterally left and right between the headrest post guides 20, 22 and from moving longitudinally forward and rearward. In addition, upward movement of the bracket assembly 10 is prevented by the headrest post guide caps 24 because the clamps 56, 58 have been secured to the headrest post guides 20, 22 at a vertical position between the top of the vehicle seat 12 and the headrest post guide caps.

Figure 8:
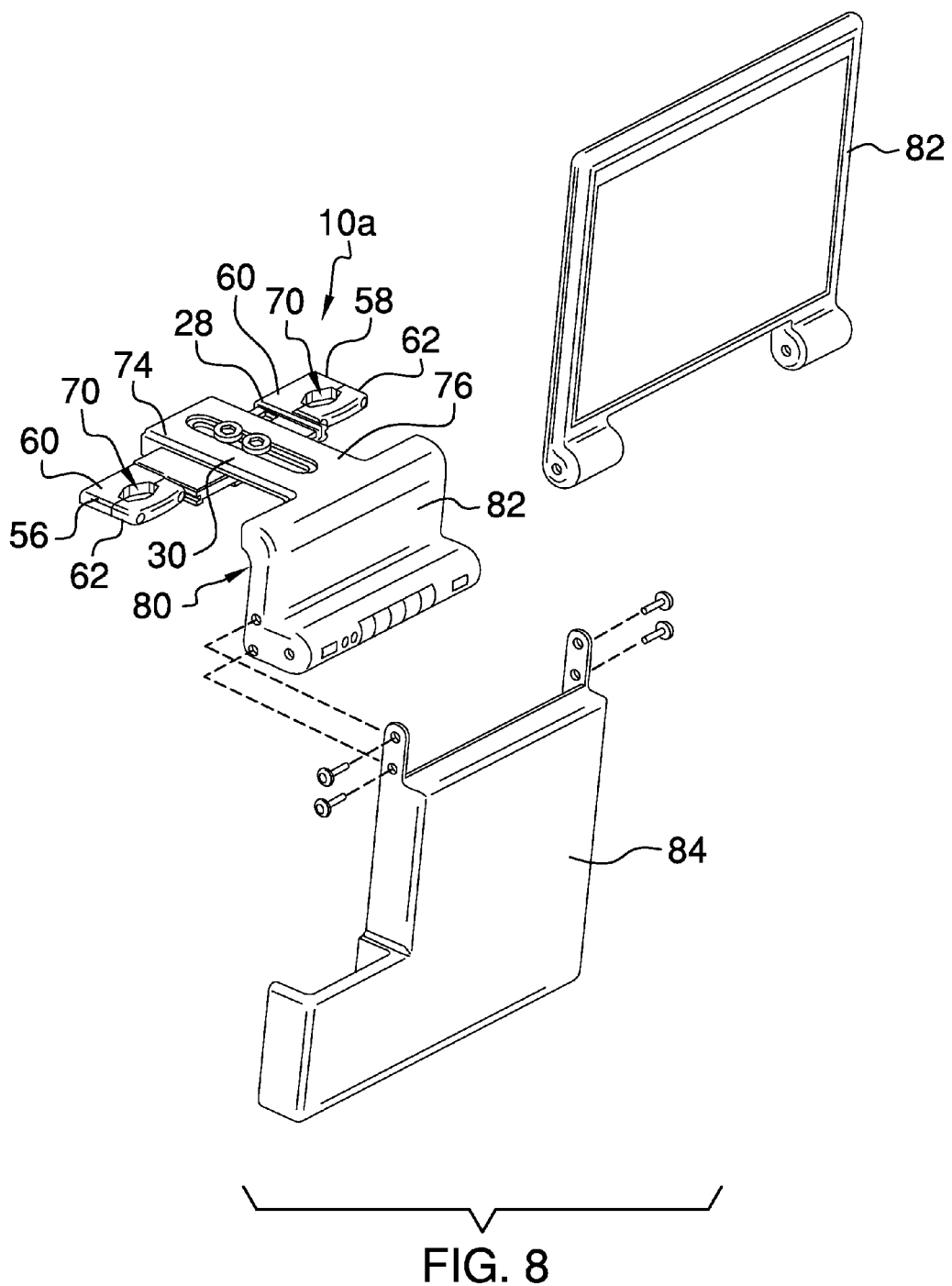
FIG. 8 is a perspective view of a bracket assembly for securing an entertainment device to a vehicle seat constructed in accordance with the principles of an alternative embodiment of the present invention and shown in use with a conventional vehicle seat.
Figure 9:
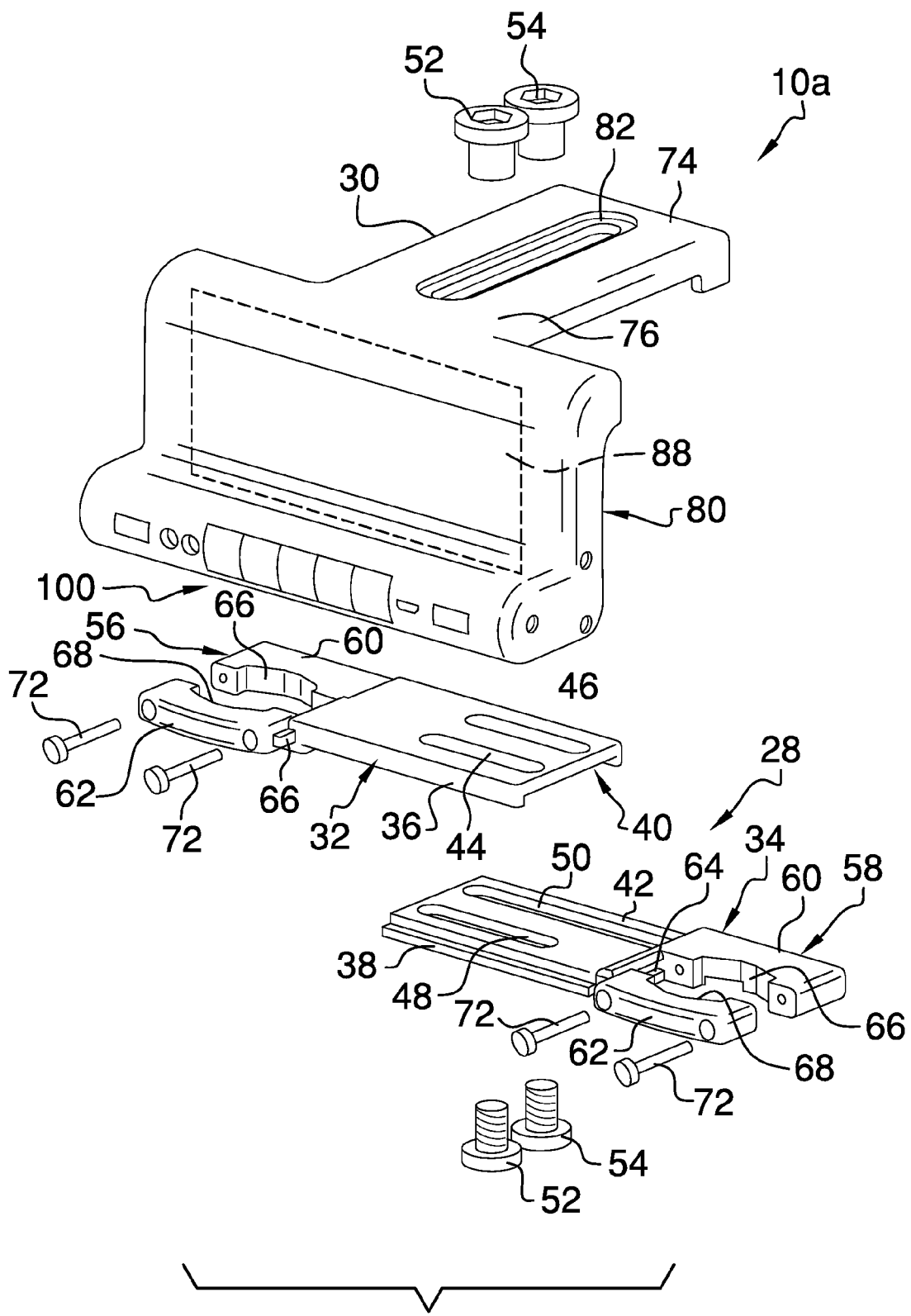
FIG. 9 is an exploded perspective view of the bracket assembly of FIG. 8.

Alternative embodiments are possible. With reference to FIGS. 8 and 9 there is representatively illustrated a mounting assembly 10a in accordance with an alternative embodiment embodying principles of the present invention. The same reference numbers refer to similar elements discussed above. Mounting assembly 10a is essentially the same as mounting assembly 10 described above with the exception of having a system mount 80 that is different from system mount 78. Particularly, system mount 80 is configured for the attachment of monitor 82 and console 84 to the second bracket member 30. System mount 80 exemplifies the numerous configurations that are possible to meet desired or required needs.

As illustrated, in this exemplary configuration, system mount 80 includes an L-shaped housing 86 to which the monitor 82 is rotatably attachable (shown exploded from the system mount) and the console 84 is fixedly attachable (shown exploded from the system mount). Housing 86 may be configured as various shapes and designs according to particular requirements and is not limited in scope to the L-shaped structure that is illustrated here.

Electronics comprising an entertainment device, representatively indicated by reference number 88, may be positioned within housing 86. Additionally, various control buttons or a user interface 100 to an entertainment device may be provided on housing 86, such as, for example, across a front face of the housing as illustrated. Console 84 would typically include additional electronics or components forming an entertainment device.

Figure 10:
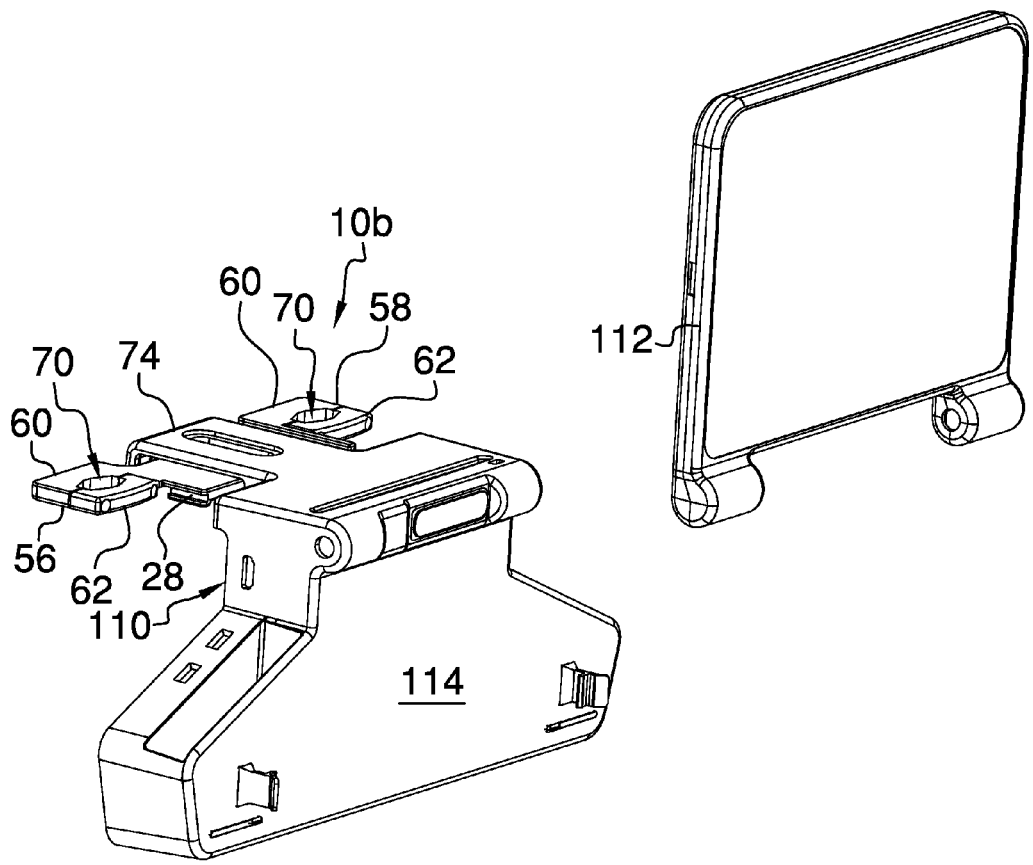
FIG. 10 is a perspective view of a bracket assembly for securing an entertainment device to a vehicle seat constructed in accordance with the principles of an alternative embodiment of the present invention and shown in use with a conventional vehicle seat.
Figure 11:
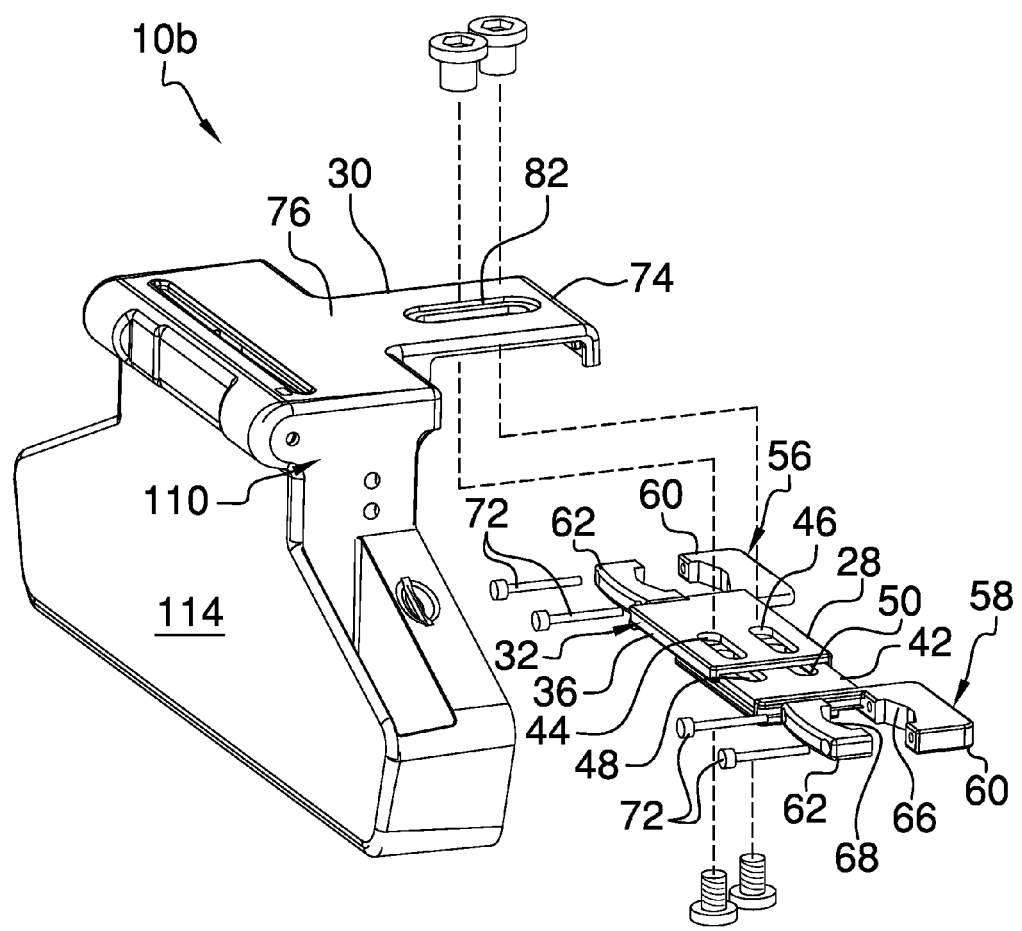
FIG. 11 is an exploded perspective view of the bracket assembly of FIG. 10.

Now with reference to FIGS. 10 and 11 there is representatively illustrated a mounting assembly 10b in accordance with an alternative embodiment embodying principles of the present invention. The same reference numbers refer to similar elements discussed above. Mounting assembly 10b, like mounting assembly 10a, is essentially the same as mounting assembly 10 described above with the exception of having a system mount 110 that is different from system mount 78 or 80. Particularly, system mount 110 is configured for the attachment of monitor 112 and the second bracket member 30 and includes an integrated, unitary console or housing 114. Again, system mount 110 exemplifies the numerous configurations that are possible to meet desired or required needs. It is contemplated that the integral housing 114 would contain or house the electronics and various components of a vehicle integrated rear seat entertainment system. Thus housing 114 would be configured to securely contain the electronics and the components of the rear seat entertainment system. Housing 114 would also be configured with various connection ports to facilitate connectivity between the rear seat entertainment system and other electronic devices. Housing 114 would also be configured to support a desired user interface of the rear seat entertainment system.

A number of embodiments of the present invention have been described. Nevertheless, it will be understood that various modifications may be made without departing from the spirit and scope of the invention. Accordingly, other embodiments are within the scope of the following claims.

What is claimed is:

1. A mounting assembly for securing an entertainment device to a vehicle seat having a pair of spaced headrest post guides extending through a top surface of the vehicle seat, the mounting assembly comprising:
    a first bracket member having first and second telescopically engaged wing members that are movable relatively to one another between extended and retracted positions to adjust to the space between the headrest post guides, said first wing member and said second wing member each configured to attach to a respective headrest post guide with said first bracket member extending between the headrest post guides; and
    a second bracket member configured to support an entertainment device, said second bracket member slidingly attached to said first bracket member and selectively securable between forward and aft locations relative to said first bracket member to position the entertainment device rearwardly of the vehicle seat.

2. The mounting assembly of claim 1, wherein said first wing member and said second wing member are each further configured to attach to the respective headrest post guide at a position between the top of the vehicle seat and a top flange of the headrest post guide and without contacting a headrest post inserted through the headrest post guide.

3. The mounting assembly of claim 1, wherein:
    said first wing member includes a downwardly open track; and
    said second wing member includes an upwardly raised platform that is slidingly received within said track so as to provided said telescopic engagement between said first wing member and said second wing member.

4. The mounting assembly of claim 1, wherein:
    said first wing member includes parallel first and second slots;
    said second wing member includes parallel third and fourth slots that are cooperatively aligned with said first and second slots, respectively;
    said second bracket member includes a fifth slot that is cooperatively aligned with said first, second, third, and fourth slots; and further comprising:
    a first fastener extending through said first, third, and fifth slot; and
    a second fastener extending through said second, fourth, and fifth slot.

5. The mounting assembly of claim 4, wherein said first and second fasteners are threaded fasteners that when loosened simultaneously permit the telescopic adjustment between said first wing member and said second wing member and the forward and aft adjustment of said second bracket, and when tightened simultaneously secure the telescopic position between said first wing member and said second wing member and the forward and aft position of said second bracket.

6. The mounting assembly of claim 1, wherein said first wing member and said second wing member each includes a post guide clamp comprising a fixed jaw member and a movable jaw member constrained for sliding movement relative to said fixed jaw member and a pair of fasteners securing said fixed jaw member with said movable jaw member.

7. A mounting assembly for securing an entertainment device to a vehicle seat, comprising:
    first and second headrest post guides, said first headrest post guide and said second headrest post guide disposed within the vehicle seat at a spaced distance between one another and having a top flange exteriorly of a top surface of the vehicle seat;
    a first bracket member, said first bracket member having a first end and a second end opposite said first end, said first end of said bracket member removably secured to said first headrest post guide between its top flange and the top of the vehicle seat, said second end of said bracket member removably secured to said second headrest post guide between its top flange and the top of the vehicle seat, and said first bracket member extending between said first headrest post guide and said second headrest post guide; and
    a second bracket member, said second bracket member configured to support an entertainment device, said second bracket member slidingly attached to said first bracket member and selectively secured to said first bracket member between forward and aft locations relative to said first bracket member positioning the entertainment device rearwardly of the vehicle seat.

8. The mounting assembly of claim 7, wherein said first bracket member is extensible between extended and retracted positions to accommodate the space between the headrest post guides.

9. The mounting assembly of claim 7, wherein each of said first end and said second end of said first bracket member includes a post guide clamp comprising a fixed jaw member and a movable jaw member constrained for sliding movement relative to said fixed jaw member and a pair of fasteners securing said fixed jaw member with said movable jaw member.

10. The mounting assembly of claim 7, wherein said first bracket member comprises:
   a first wing member and a second wing member, said first wind member and said second wing member telescopically engaged and movable relatively to one another between extended and retracted positions to adjust to the space between the headrest post guides; and
   wherein said first wing member has said first end of said first bracket and said second wing member has said second end of said first bracket member.

11. The mounting assembly of claim 10, wherein:
   said first wing member includes a downwardly open track; and
   said second wing member includes an upwardly raised platform that is slidingly received within said track so as to provided said telescopic engagement between said first wing member and said second wing member.

12. The mounting assembly of claim 11, wherein:
   said first wing member includes parallel first and second slots;
   said second wing member includes parallel third and fourth slots that are cooperatively aligned with said first and second slots, respectively;
   said second bracket member includes a fifth slot that is cooperatively aligned with said first, second, third, and fourth slots; and further comprising:
   a first fastener extending through said first, third, and fifth slot; and
   a second fastener extending through said second, fourth, and fifth slot.

13. The mounting assembly of claim 12, wherein said first and second fasteners are threaded fasteners that when loosened simultaneously permit the telescopic adjustment between said first wing member and said second wing member and the forward and aft adjustment of said second bracket, and when tightened simultaneously secure the telescopic position between said first wing member and said second wing member and the forward and aft position of said second bracket.

* * * * *